(12) United States Patent
Kim et al.

(10) Patent No.: US 10,697,608 B2
(45) Date of Patent: Jun. 30, 2020

(54) LAMP FOR VEHICLE

(71) Applicant: SL Corporation, Daegu (KR)

(72) Inventors: Dong Hyun Kim, Gyeongsangbuk-do (KR); Byoung Hwa Jung, Gyeongsangbuk-do (KR)

(73) Assignee: SL Corporation, Daegu (KR)

( * ) Notice: Subject to any disclaimer, the term of this patent is extended or adjusted under 35 U.S.C. 154(b) by 52 days.

(21) Appl. No.: 16/159,985

(22) Filed: Oct. 15, 2018

(65) Prior Publication Data
US 2019/0162383 A1    May 30, 2019

(30) Foreign Application Priority Data
Nov. 29, 2017    (KR) .......................... 10-2017-0162004

(51) Int. Cl.

| | |
|---|---|
| *F21V 21/00* | (2006.01) |
| *F21S 43/245* | (2018.01) |
| *F21S 43/249* | (2018.01) |
| *F21S 41/24* | (2018.01) |
| *F21S 41/125* | (2018.01) |
| *F21V 8/00* | (2006.01) |
| *F21S 43/239* | (2018.01) |

(52) U.S. Cl.
CPC .......... *F21S 43/245* (2018.01); *F21S 41/125* (2018.01); *F21S 41/24* (2018.01); *F21S 43/239* (2018.01); *F21S 43/249* (2018.01); *G02B 6/0036* (2013.01)

(58) Field of Classification Search
CPC ........ F21S 41/24; F21S 41/125; F21S 43/249; F21S 43/239; G02B 6/0036; H02J 7/0021; H02J 7/0049; H02J 7/0048; B60Q 1/2607; B60Q 3/18; B60Q 3/85; B60Q 11/007
USPC ....... 362/511, 616, 547, 517, 601, 602, 603, 362/625, 626
See application file for complete search history.

(56) References Cited

U.S. PATENT DOCUMENTS

| | | | | |
|---|---|---|---|---|
| 8,764,266 | B2* | 7/2014 | Urtiga .................... | G09F 13/18 362/612 |
| 8,998,436 | B2* | 4/2015 | Ke ........................ | G02B 6/0068 362/231 |
| 8,998,479 | B2* | 4/2015 | Brick .................... | G02B 6/0041 362/608 |
| 9,103,959 | B2* | 8/2015 | Jeong .................... | G02B 6/003 |
| 10,447,987 | B2* | 10/2019 | Lee ....................... | H04N 13/128 |
| 10,488,577 | B2* | 11/2019 | Ochi ..................... | G02B 6/0043 |
| 2011/0007524 | A1* | 1/2011 | Nagatani .............. | G02B 6/0061 362/616 |
| 2012/0087145 | A1* | 4/2012 | Hudson ................. | F21V 11/00 362/601 |

(Continued)

*Primary Examiner* — Laura K Tso
(74) *Attorney, Agent, or Firm* — Nelson Mullins Riley & Scarborough LLP; Kongsik Kim, Esq.

(57) ABSTRACT

A lamp for a vehicle capable of forming an image having a three-dimensional effect is provided. The lamp for the vehicle includes a first image forming part configured to emit light incident from at least one first light source to form a first image, and a second image forming part configured to emit light incident from at least one second light source to form a second image combined with the first image to form a predetermined pattern shape, wherein the light emitted from the second image forming part passes through the first image forming part to form the second image, and the first image and the second image have different color characteristics.

15 Claims, 13 Drawing Sheets

(56) References Cited

U.S. PATENT DOCUMENTS

2013/0229828 A1\* 9/2013 Chen .................... G02B 6/0076
362/616
2015/0316227 A1\* 11/2015 Sahlin ................. B60Q 1/0058
362/511

\* cited by examiner

| R / P | DIFFUSION ANGLE | BEAM PATTERN |
|---|---|---|
| 0.5 | 100° |  |
| 0.55 | 79° |  |
| 0.6 | 75° |  |
| 0.65 | 70° |  |
| 0.7 | 68° |  | ously interpretation of the present disclosure.

LAMP FOR VEHICLE

CROSS-REFERENCE TO RELATED APPLICATION

This application claims priority from Korean Patent Application No. 10-2017-0162004 filed on Nov. 29, 2017, the disclosure of which is incorporated herein by reference in its entirety.

BACKGROUND

1. Field of the Disclosure

The present disclosure relates to a lamp for a vehicle, and more specifically, to a lamp for a vehicle capable of forming an image having a three-dimensional effect.

2. Description of the Related Art

Generally, a vehicle includes various lamps for a vehicle with an illumination function of allowing an object disposed near the vehicle to be more easily seen when operating during low light conditions (e.g., night time), and a signaling function of informing other vehicles or pedestrians of a driving state of the vehicle. For example, a head lamp, a fog lamp, and the like are provided for an illumination function, and a turn signal lamp, a tail lamp, a brake lamp, and the like are provided for a signaling function.

A lamp for a vehicle has merely been a means to emit illumination or a means to inform signals to the outside, but recently, importance of the lamp in terms of an aspect of design has rapidly increased. Accordingly, both a functional aspect of allowing a driver to have a secured view or allowing drivers of nearby vehicles to have secured visibility, which is a basic function of the lamp for a vehicle, and also an aesthetic aspect experienced by a consumer through design improvement highly influence decision for purchasing a vehicle.

Accordingly, a method capable of both implementing a stable image through simple lighting of a light source and also providing an improved visual effect in a design is required.

SUMMARY

The present disclosure is directed to a lamp for a vehicle capable of forming a pattern having a three-dimensional effect through a combination of images having different color characteristics.

It should be noted that objects of the present disclosure are not limited to the above-mentioned objects, and other objects of the present disclosure will be apparent to those skilled in the art from the following descriptions.

A lamp for a vehicle according to an embodiment of the present disclosure may include a first image forming part configured to emit light incident from at least one first light source to form a first image, and a second image forming part configured to emit light incident from at least one second light source to form a second image combined with the first image to form a predetermined pattern shape, wherein the light emitted from the second image forming part may pass through the first image forming part to form the second image, and the first image and the second image may have different color characteristics.

Other details of the present disclosure are included in the detailed description and accompanying drawings which will be described below.

BRIEF DESCRIPTION OF THE DRAWINGS

The above and other aspects and features of the present disclosure will become more apparent by describing in detail exemplary embodiments thereof with reference to the attached drawings, in which.

DETAILED DESCRIPTION

Advantages and characteristics of the present disclosure, and a method of achieving the same will be apparent by referring to exemplary embodiments which will be described below in detail with the accompanying drawings. However, the present disclosure is not limited to the exemplary embodiments which will be described below but may be implemented in various different forms, and the exemplary embodiments are provided merely so that the present disclosure is complete and those skilled in the art of the present disclosure can have a complete understanding of the scope of the present disclosure, and the present disclosure is defined only by the scope of the claims. The same reference symbols refer to the same or similar components throughout the description.

Accordingly, in some exemplary embodiments, well-known processes, well-known structures, and well-known technologies are not specifically described to avoid ambiguous interpretation of the present disclosure.

Further, terms used herein are only for the purpose of describing exemplary embodiments and are not intended to limit the present disclosure. Singular forms are intended to also include plural referents unless the context clearly indicates otherwise. It should be further understood that the terms "comprise" and/or "comprising" do not preclude the presence or addition of one or more elements, steps, or operations other than the elements, steps, or operations specifically described. Further, the term "and/or" or "at least one of A or B" includes combinations of any or all of the mentioned items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Further, exemplary embodiments which will be disclosed in the description will be described with reference to perspective views, cross-sectional views, side views, and/or schematic views which are ideal exemplary views of the present disclosure. Accordingly, shapes of the exemplary views may change according to a manufacturing technology, an allowable tolerance, and/or the like. Accordingly, the exemplary embodiments of the present disclosure are not limited to the particular shapes that are shown but include changes of shapes formed based on a manufacturing process. Further, in each of the views shown in the exemplary embodiments of the present disclosure, each of the elements may be expanded or downscaled to be shown for convenience of the description.

Hereinafter, the present disclosure will be described with reference to the drawings for describing a lamp for a vehicle according to exemplary embodiments of the present disclosure.

Figure 1:
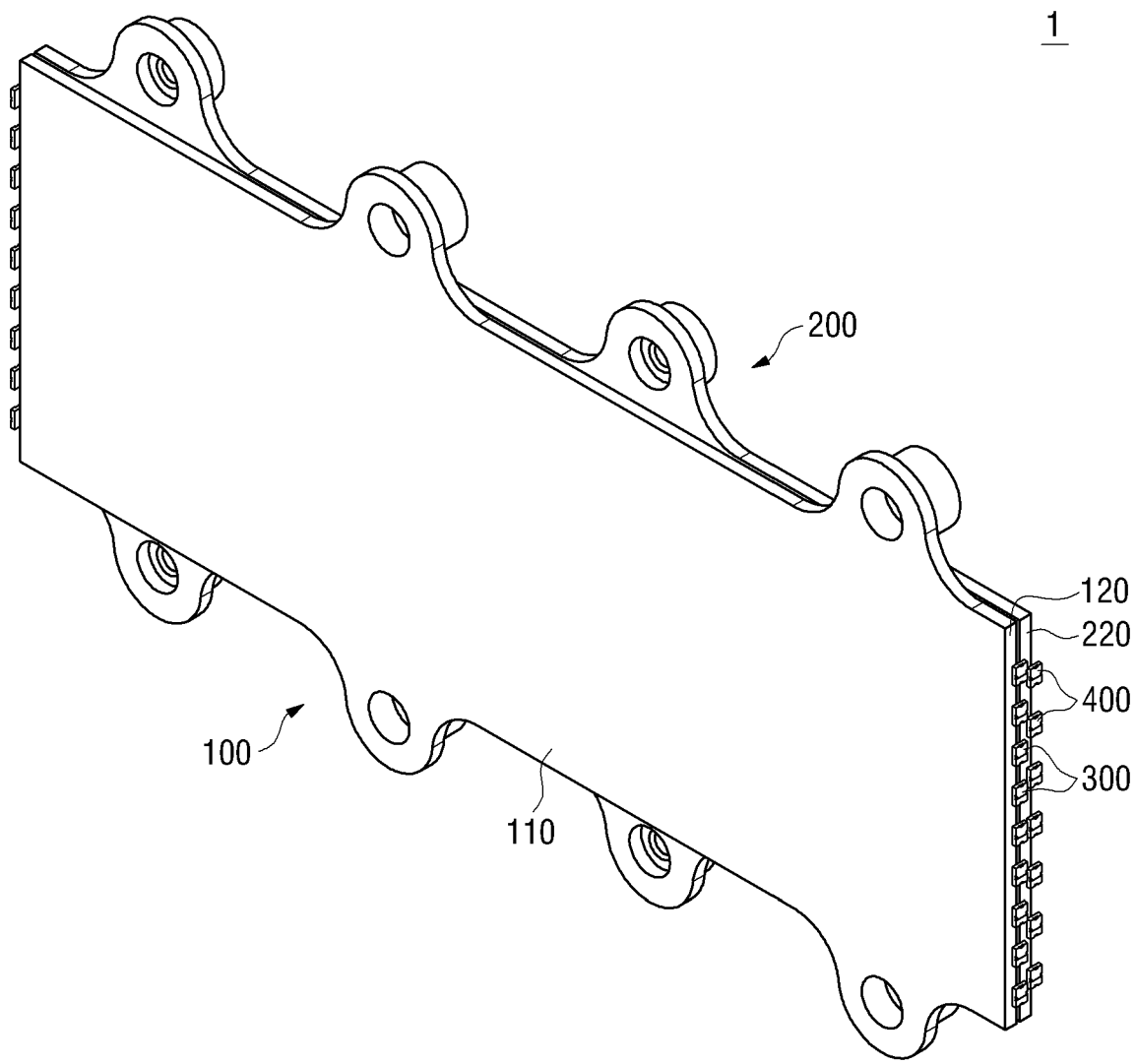
FIGS. 1 and 2 are perspective views illustrating a lamp for a vehicle according to an exemplary embodiment of the present disclosure.
Figure 2:
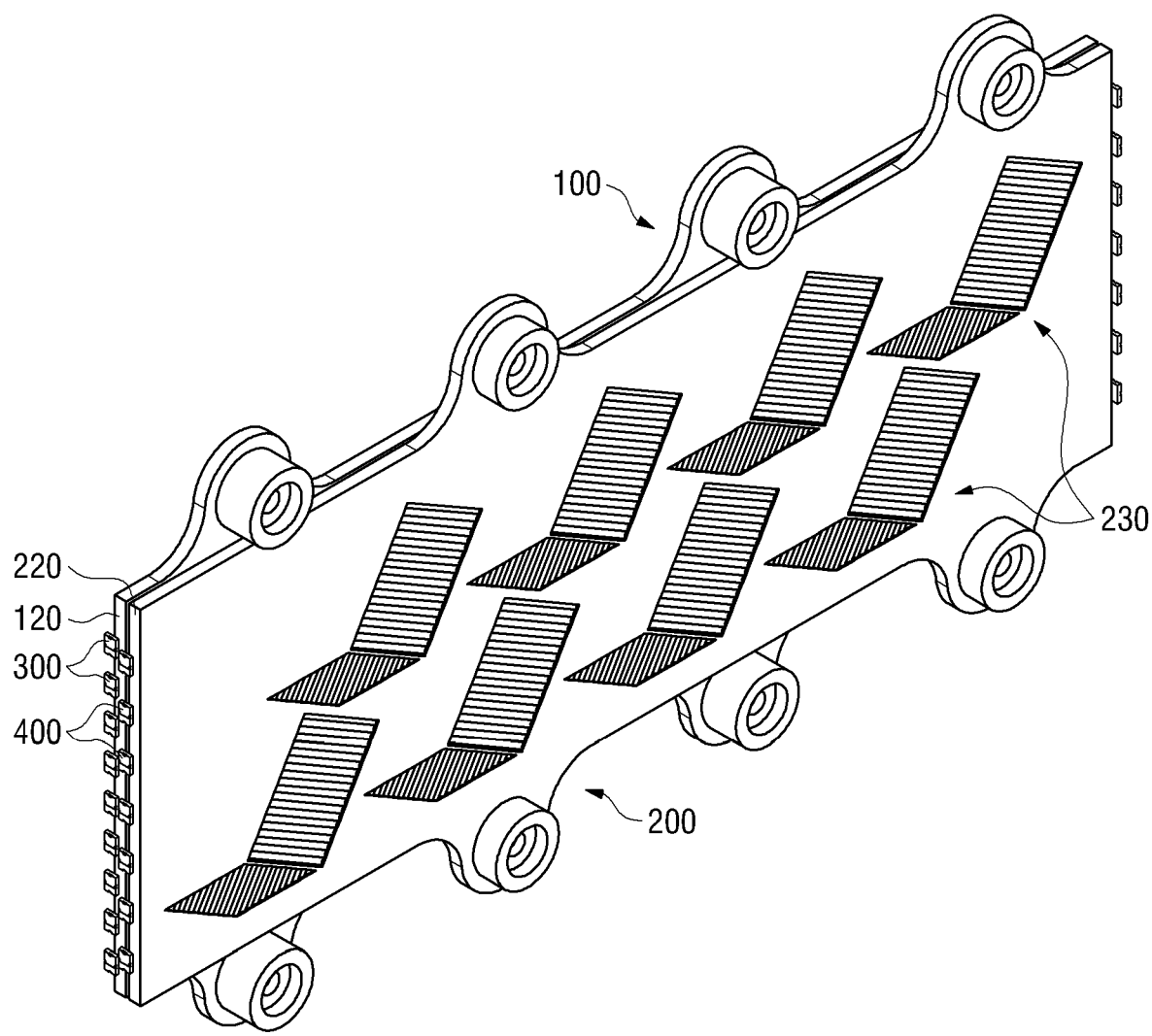
Figure 3:
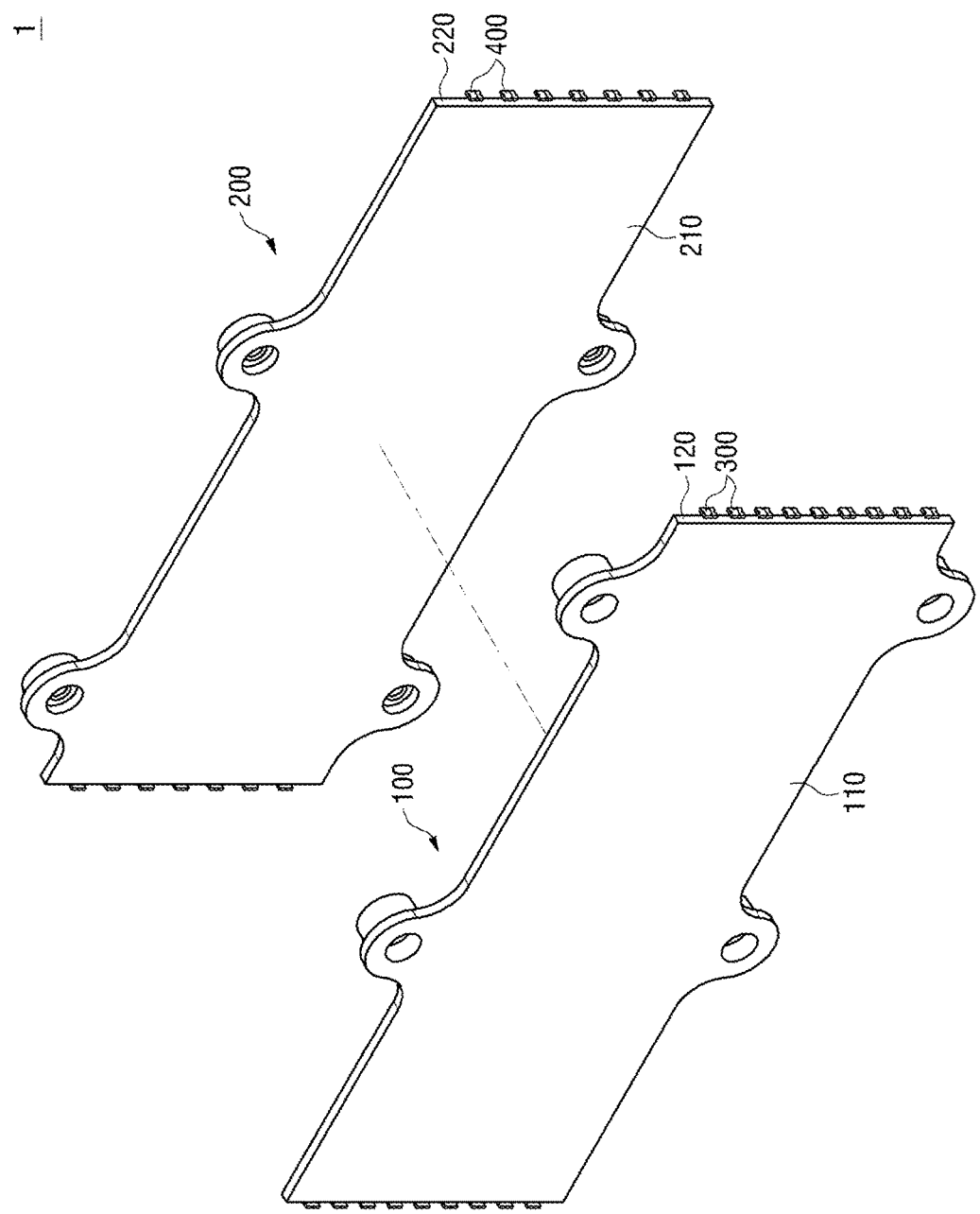
FIGS. 3 and 4 are exploded perspective views illustrating the lamp for a vehicle according to the exemplary embodiment of the present disclosure.
Figure 4:
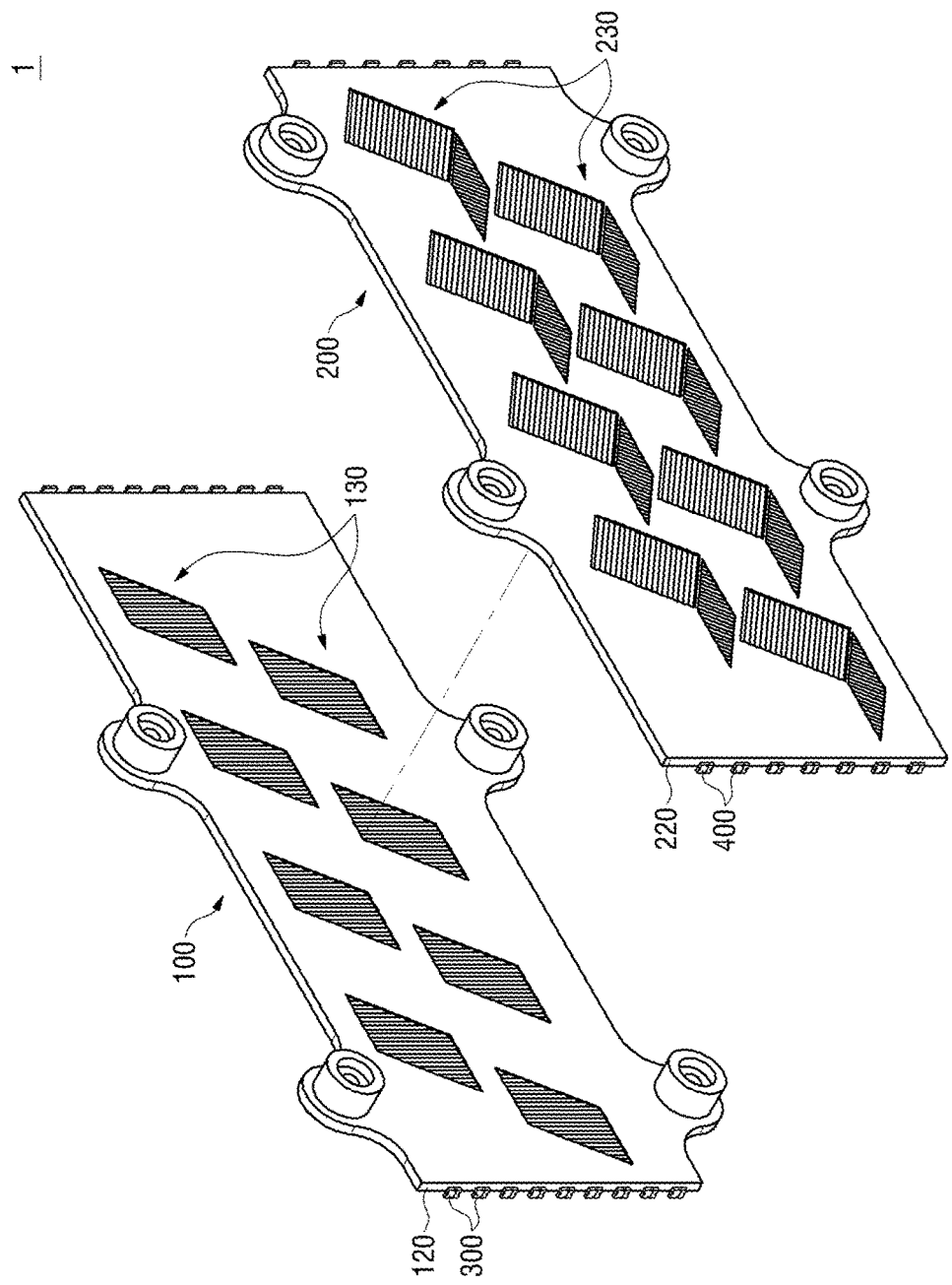

FIGS. 1 and 2 are perspective views illustrating a lamp for a vehicle according to an exemplary embodiment of the present disclosure, and FIGS. 3 and 4 are exploded perspective views illustrating the lamp for a vehicle according to the exemplary embodiment of the present disclosure. Referring to FIGS. 1 to 4, a lamp for a vehicle 1 according to the exemplary embodiment of the present disclosure may include a first image forming part 100 and a second image forming part 200.

The lamp for a vehicle 1 according to the exemplary embodiment of the present disclosure may be used to inform a driving state of a vehicle to nearby vehicles or pedestrians such as a daytime driving lamp, a position lamp, a turn signal lamp, a tail lamp, a brake lamp, and the like. However, the application is not limited thereto, and the lamp for a vehicle 1 according to the exemplary embodiment of the present disclosure may also be used as any of various lamps installed in the vehicle. Further, the lamp for a vehicle 1 may be used for at least two purposes in the exemplary embodiment of the present disclosure, and at least a part of a color characteristic of an image formed by light emitted from the lamp for a vehicle 1 may be varied based on each purpose.

In particular, the color characteristic of the image formed by the lamp for a vehicle 1 may include at least one of a color, brightness, or chroma, and a case in which the at least one of the color characteristic of the image is varied based on the purpose of the lamp for a vehicle 1 may be understood as a case in which at least one of the color, the brightness, or the chroma of at least a part of the image is varied.

The first image forming part 100 may emit light incident from at least one first light source 300 to form a first image. In the exemplary embodiment of the present disclosure, the first image forming part 100 may be a light guide configured to guide light incident to at least one incident surface 120 disposed at a side of an emitting surface 110 therein to emit the light to the emitting surface 110 or a light guide body such as a lens or the like. However, the present disclosure is not limited thereto, and various kinds of optical members configured to emit the light incident from the at least one first light source 300 to form the first image may be used as the first image forming part 100.

The first image forming part 100 may have a first pattern part 130 configured to reflect light incident to the at least one incident surface 120 to the emitting surface 110 to be emitted through the emitting surface 110 on one surface thereof, and since the first image formed by the first image forming part 100 is formed by the light reflected to the emitting surface 110 by the first pattern part 130, the first image may have a shape that corresponds to the first pattern part 130.

A plurality of first pattern parts 130 may be formed on one surface of the first image forming part 100 in the exemplary embodiment of the present disclosure, and although one of the plurality of first pattern parts 130 is described hereinafter in the exemplary embodiment of the present disclosure, other first pattern parts 130 may also be identically described.

Figure 5:
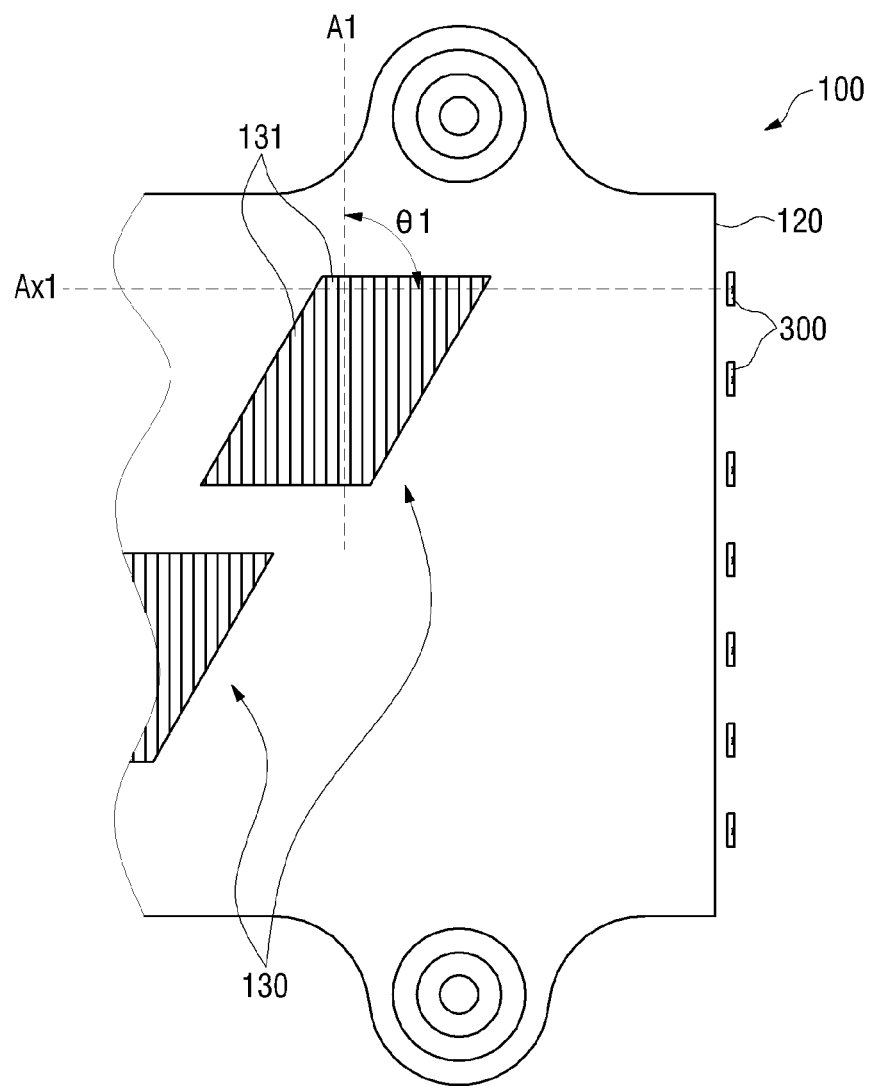
FIG. 5 is a schematic view illustrating a forming direction of an optical pattern of a first pattern part according to the exemplary embodiment of the present disclosure.

FIG. 5 is a schematic view illustrating the first pattern part according to the exemplary embodiment of the present disclosure. Referring to FIG. 5, the first pattern part 130 according to the exemplary embodiment of the present disclosure may include at least one optical pattern 131 configured to reflect the light incident to the at least one incident surface 120 to the emitting surface 110, and the at least one optical pattern 131 may be formed integrally with the first image forming part 100 by an injection-molding process or separately from the first image forming part 100 by surface processing of the first image forming part 100. However, the forming methods are not limited thereto, and the at least one optical pattern 131 may also be attached to one surface of the first image forming part 100 in a film shape.

In the exemplary embodiment of the present disclosure, the at least one optical pattern 131 may include a concave shape with respect to one surface of the first image forming part 100, but the present disclosure is not limited thereto, and the at least one optical pattern 131 may include both a convex shape with respect to one surface of the first image forming part 100 and also various shapes capable of reflecting the light incident to the at least one incident surface 120 to the emitting surface 110.

The first pattern part 130 may allow the light to be reflected to the emitting surface 110 at different light amounts based on a direction in which the at least one optical pattern 131 is formed to vary luminance of the first image formed by the first image forming part 100. In particular, the at least one optical pattern 131 may be formed to extend in a predetermined direction, and the light amount of the light reflected to the emitting surface 110 by the first pattern part 130 may be varied based on an angle θ1 between a forming direction A1 of the at least one optical pattern 131 and a light axis Ax1 of the at least one first light source 300.

For example, as shown in Table 1, in the case in which a light amount of light generated from the at least one first light source 300 is 126 lumen (lm), in the first pattern part 130, a light amount of the light reflected by the first pattern part 130 may decrease and thus the luminance of the first image formed by the light reflected to the emitting surface 110 by the first pattern part 130 may decrease when the angle θ1 between the forming direction A1 of the at least one optical pattern 131 and the light axis Ax1 of the at least one first light source 300 decreases (e.g., deviate more from a right angle). Conversely, the light amount of the light reflected by the first pattern part 130 may increase and thus the luminance of the first image formed by the light reflected to the emitting surface 110 by first pattern part 130 may increase when the angle θ1 between the forming direction A1 of the at least one optical pattern 131 and the light axis Ax1 of the at least one first light source 300 becomes closer to a right angle.

In other words, the light amount of the reflected light may be smallest when the forming direction A1 of the at least one optical pattern 131 and the light axis Ax1 of the at least one first light source 300 are parallel to each other, and the light amount of the reflected light may be greatest when the forming direction A1 of the at least one optical pattern 131 and the light axis Ax1 of the at least one first light source 300 are perpendicular to each other.

TABLE 1

| Angle (θ1) | 0 | 10 | 20 | 30 | 40 | 50 | 60 | 70 | 80 | 90 |
|---|---|---|---|---|---|---|---|---|---|---|
| Luminance (cd/m$^2$) | 260 | 420 | 480 | 500 | 800 | 1720 | 2200 | 3000 | 4200 | 6000 |

In this case, the luminance of the first image based on the angle θ1 between the forming direction A1 of the at least one optical pattern 131 and the light axis Ax1 of the at least one first light source 300 is not limited to the values in Table 1, and may be varied based on the light amount of the at least one first light source 300, a light transmissivity of the first image forming part 100, or the like. Accordingly, a color characteristic, e.g., brightness of the first image formed by the first image forming part 100 may be varied through the angle θ1 between the forming direction A1 of the at least one optical pattern 131 and the light axis Ax1 of the at least one first light source 300.

In the exemplary embodiment of the present disclosure, a plurality of first pattern parts 130 may be arranged in a predetermined direction to allow the at least one optical pattern 131 to have a shape of the first image. However, since the above is merely an example for understanding the present disclosure, the present disclosure is not limited thereto, and the number, a length, a forming direction, and the like of the at least one optical pattern 131 may be varied based on the shape, the color characteristic, or the like of the first image.

Figure 6:
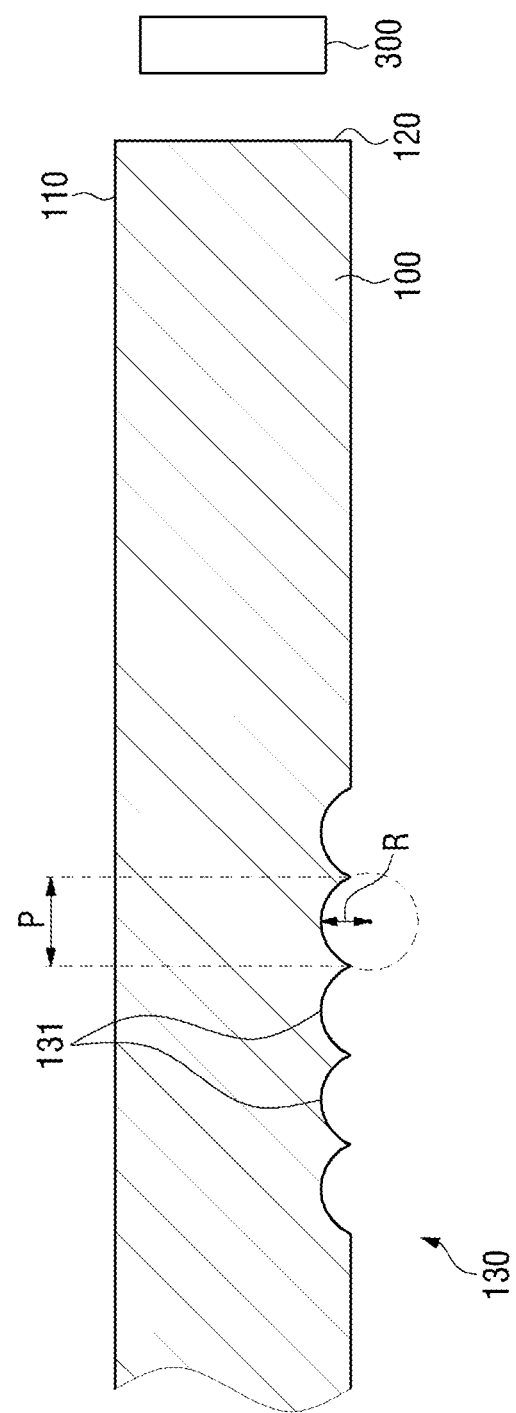
FIG. 6 is a schematic view illustrating a shape of the optical pattern of the first pattern part according to the exemplary embodiment of the present disclosure.

As described above, when the plurality of optical patterns 131 are arranged in the predetermined direction, each of the optical patterns 131 may have a width P that ranges from about 0.5 to about 2 mm in a direction in which the optical patterns 131 are arranged as shown in FIG. 6, since it is more difficult to manufacture each of the optical patterns 131 in a particular shape through an injection-molding process, surface processing, or the like when the width P is less than about 0.5 mm, and a degree in which the light is scattered decreases, a possibility that the inside of the lamp for a vehicle 1 of the present disclosure is detected from the outside increases, and thus an exterior design may be degraded when the width P of each of the optical pattern 131 is greater than about 2 mm.

Further, the at least one optical pattern 131 may be formed to have a shape of a circumference of a circle having a radius R of about 50 to 70% with respect to the width P. In other words, as shown in the above-described FIG. 6, in the at least one optical pattern 131, a distance between two positions on the circumference which encounters a secant line in the circle having the radius R may be the width P, and in this case, R/P may be understood to be about 0.5 to 0.7.

Light reflected to the emitting surface 110 by the at least one optical pattern 131 may have different diffusion angles due to the R/P, and the at least one optical pattern 131 may have a greater diffusion angle when the R/P is small and a curvature is large. A case in which the diffusion angle of the light reflected to the emitting surface 110 by the at least one optical pattern 131 is large may be understood as a case in which the first image may be detected from a wider scope, and the R/P may be determined to allow the light reflected to the emitting surface 110 to have a particular diffusion angle in accordance with the purpose of the lamp for a vehicle 1 of the present disclosure.

Figure 7:
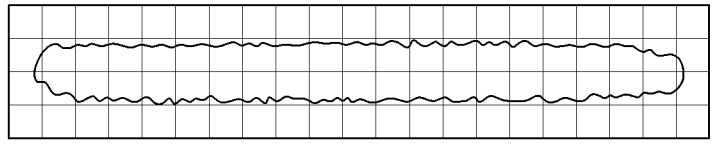
FIG. 7 is a schematic view illustrating a diffusion angle of light with respect to the shape of the optical pattern of the first pattern part according to the exemplary embodiment of the present disclosure.
Figure 7:
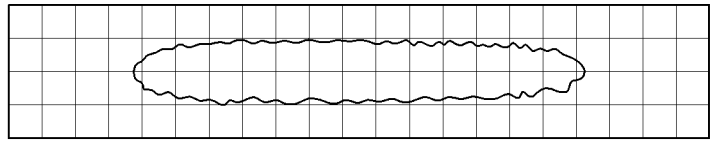
Figure 7:
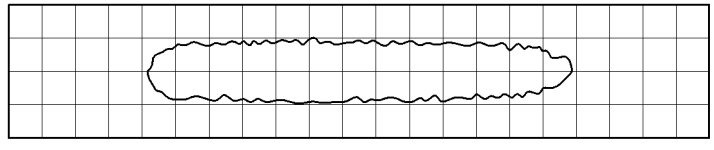
Figure 7:
Figure 7:
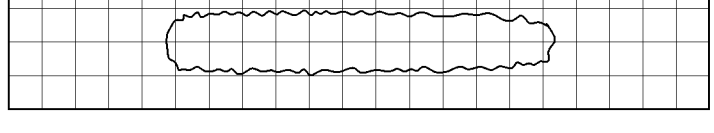

For example, as shown in FIG. 7, the at least one optical pattern 131 may allow a beam pattern having a diffusion angle of 100° to be formed when the R/P is 0.5, and may allow a beam pattern having a diffusion angle of 68° to be formed when the R/P is 0.7. The diffusion angle of the light reflected by the at least one optical pattern 131 is not limited to the values disclosed in FIG. 7, and the diffusion angle may be varied by the curvature, the R/P, or the like of the at least one optical pattern 131.

Figure 8:
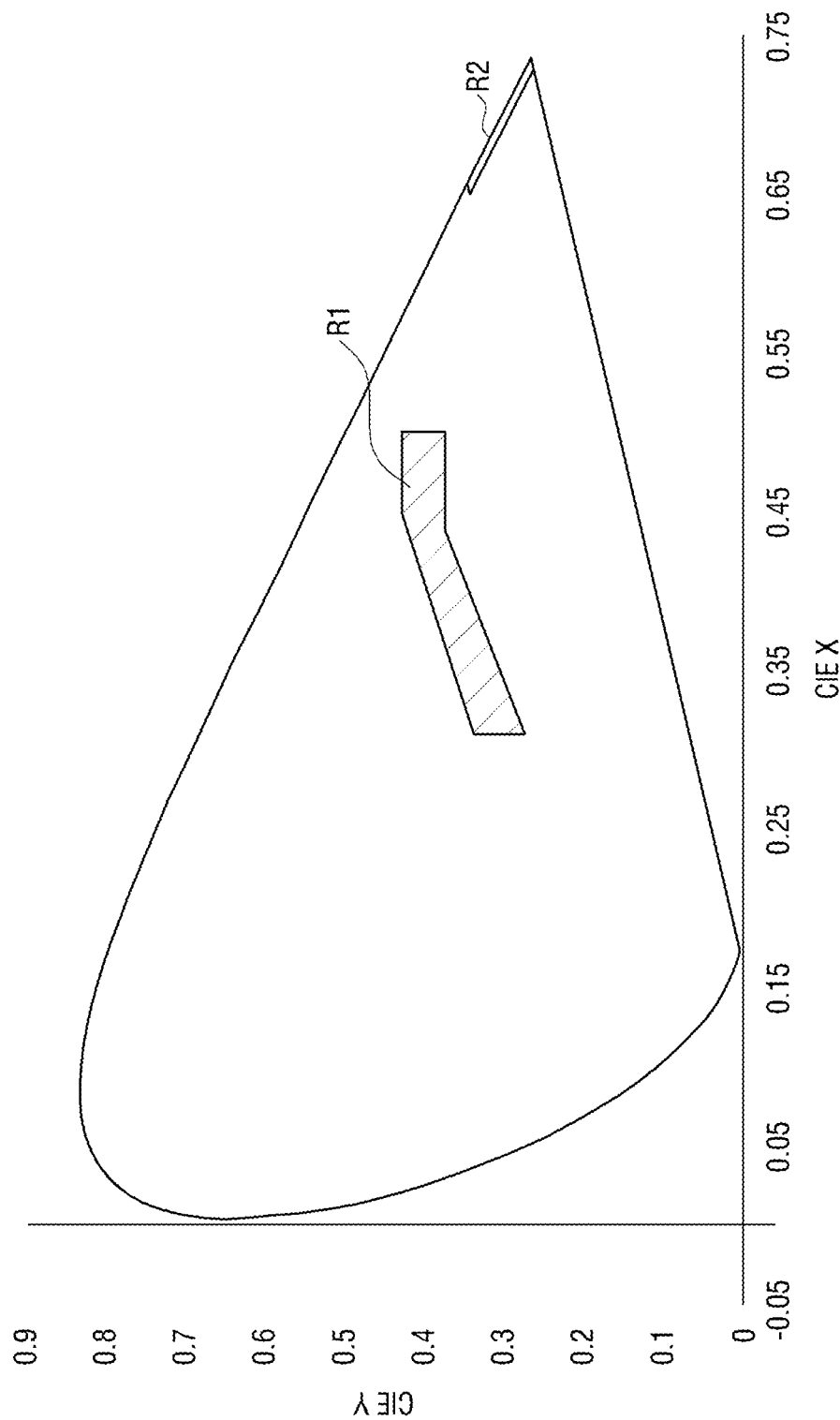
FIG. 8 is a schematic view illustrating color coordinates of light generated from a first light source and a second light source according to the exemplary embodiment of the present disclosure.

Since the lamp for a vehicle 1 is used for informing the driving state of the vehicle in the exemplary embodiment of the present disclosure, the at least one first light source 300 may generate substantially white light or substantially red light, and as shown in FIG. 8, the at least one first light source 300 may generate white light of which color coordinates (x, y) are included in a scope R1 of 0.310≤x≤0.500 and 0.283≤y≤0.440, or red light of which color coordinates (x, y) are included in a scope R2 of 0.645≤x≤0.735 and 0.259≤y≤0.335 with respect to the CIE 1931 color coordinate system. The light generated from the at least one first light source 300 is not limited to FIG. 8, and the light included in various scopes in the color coordinate system may be generated in accordance with the purpose of the lamp for a vehicle 1 the present disclosure.

Figure 9:
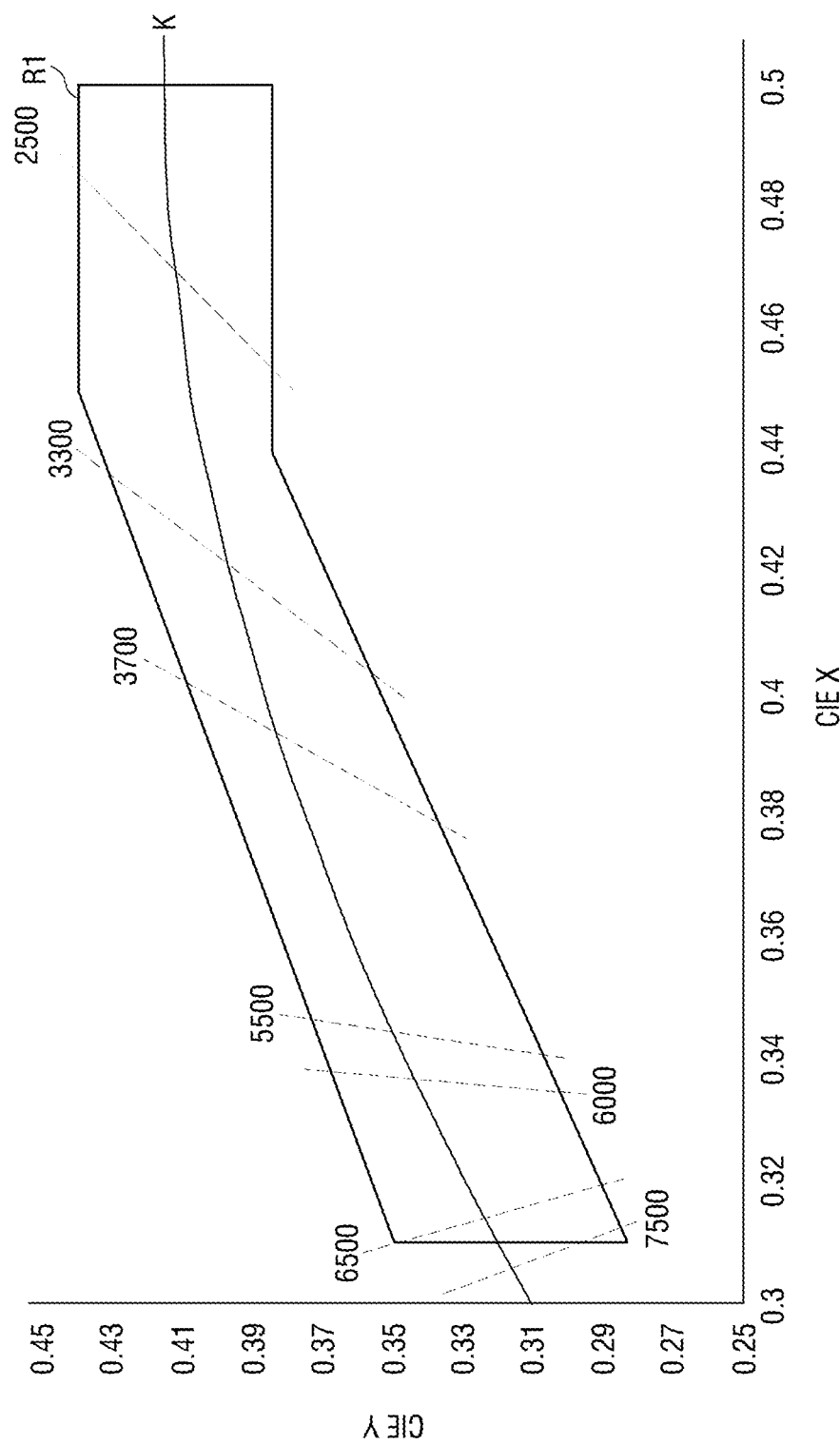
FIG. 9 is a schematic view illustrating a color temperature of the light generated from the first light source according to the exemplary embodiment of the present disclosure.

When the white light is generated from the at least one first light source 300, as shown in FIG. 9, the at least one first light source 300 may generate light having a color temperature that ranges from about 2500 to about 6500 K, and the color characteristic of the first image may be varied based on the color temperature of the light generated from the at least one first light source 300. For example, when the white light is used as the at least one first light source 300, since the light with a color temperature of about 2500 K provides a warm feeling as a bulb color, and the light with a color temperature of about 6500 K provides a cool feeling similar to a daylight color, the color characteristic of the first image may be varied by adjusting the color temperature of the light generated from the at least one first light source 300.

Figure 10:
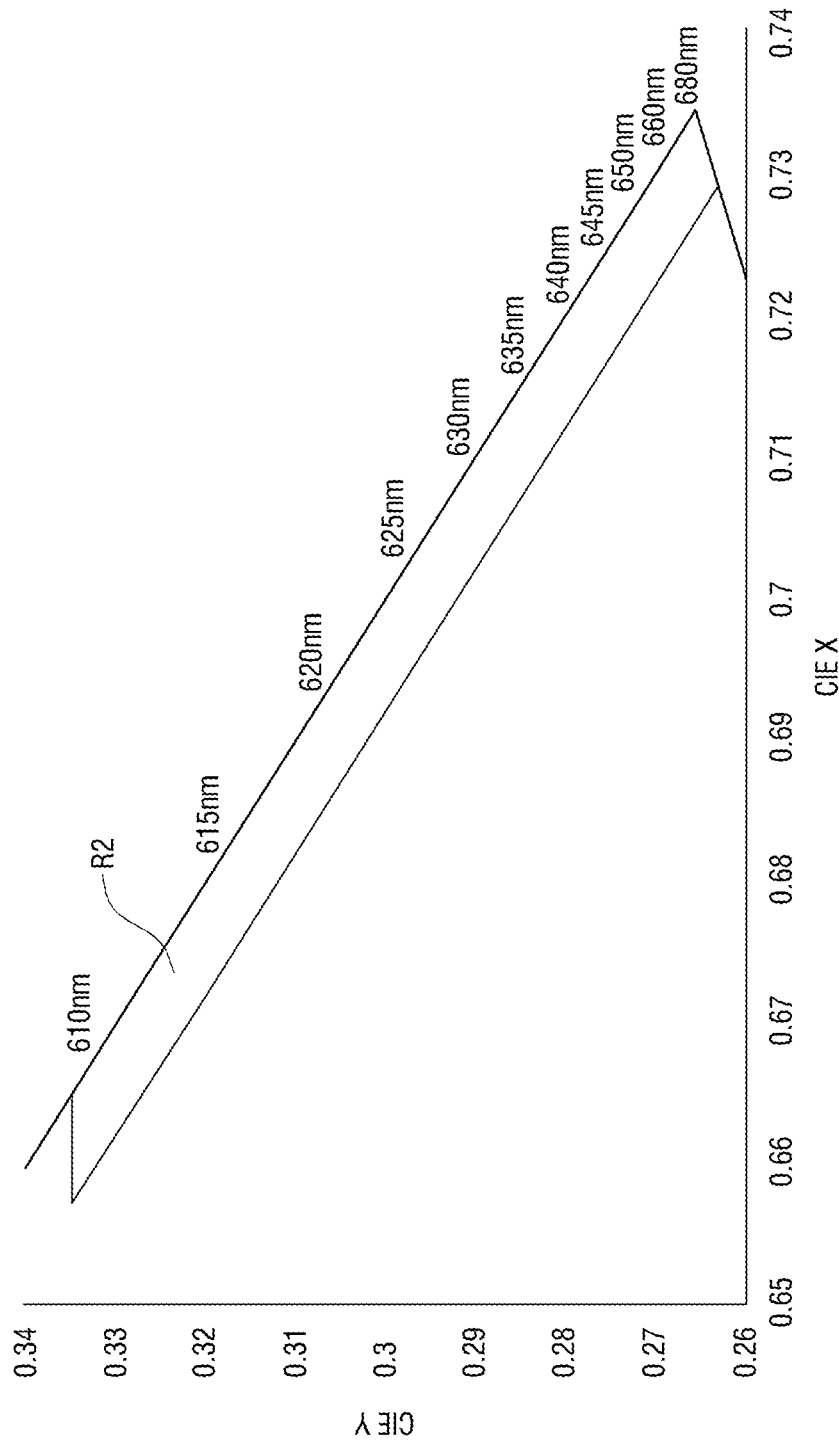
FIG. 10 is a schematic view illustrating a wavelength of the light generated from the second light source according to the exemplary embodiment of the present disclosure.

Further, when the red light is generated from the at least one first light source 300, as shown in FIG. 10, the at least one first light source 300 may generate light having a wavelength that ranges from about 610 to about 680 nm, and the color characteristic of the first image may be varied based on the wavelength of the light generated from the at least one first light source 300. For example, when the red light is used as the at least one first light source 300, since the light with a wavelength of about 617 nm has a red color, and the light with a wavelength of about 633 nm has a super red (e.g., more saturated red) color, the color characteristic of the first image may be varied by adjusting the wavelength of the light generated from the at least one first light source 300.

In the above-described exemplary embodiment, the color characteristic of the first image formed by the first image forming part 100 may be varied by the color characteristic of the light generated from the at least one first light source 300 and the forming direction A1 of the at least one optical pattern 131 of the first pattern part 130, however, the present disclosure is not limited thereto, and the color characteristic of the first image may also be varied based on a color characteristic of the first image forming part 100, e.g., a color of the light guide body, or the like. For example, when the first image forming part 100 is a colored light guide body, the light incident from the at least one first light source 300 and reflected to the emitting surface 110 by the first pattern part 130 may form the first image in which a color of the first image forming part 100 is a mixed color.

Referring to FIGS. 1 to 4 again, the second image forming part 200 may emit light incident from at least one second light source 400 to form a second image. Like the above-described first image forming part 100, a light guide body configured to emit light incident to at least one incident surface 220 disposed at a side of an emitting surface 210 to the emitting surface 210 by guiding the light from the inside thereof may be used as the second image forming part 200.

The second image forming part 200 may have a second pattern part 230 configured to reflect light incident to the at least one incident surface 220 to the emitting surface 210 on one surface thereof, and the second image formed by the second image forming part 200 may have a shape that corresponds to the second pattern part 230. The light emitted from the second image forming part 200 may pass through the first image forming part 100 to form the second image, and the second image forming part 200 may accordingly be disposed behind (e.g., adjacent to) the first image forming part 100.

In the exemplary embodiment of the present disclosure, that the second image forming part 200 is disposed behind the first image forming part 100 may be understood based on when the direction of the light emitted from the lamp for a vehicle 1 of the present disclosure is assumed as a forward direction, and an actual direction referred to by a forward direction and a backward direction may be changed based on an installation location, an installation direction, and the like of the lamp for a vehicle 1 of the present disclosure.

The second image formed by the second image forming part 200 may be combined with the first image formed by the first image forming part 100 to form a predetermined pattern shape, and a three-dimensional effect may be applied to the pattern shape according to color characteristics of the first image and the second image, which will be described later.

In the exemplary embodiment of the present disclosure, the first pattern part 130 and the second pattern part 230 may be formed to not overlap in a direction perpendicular to the direction in which the light is emitted from the lamp for a vehicle 1 of the present disclosure to allow each of the light reflected by the first pattern part 130 and the light reflected by the second pattern part 230 to form the first image and the second image. However, since the above is merely an example for understanding the present disclosure, the present disclosure is not limited thereto, and the first pattern part 130 and the second pattern part 230 may be formed to partially overlap each other in the direction perpendicular to the direction in which the light is emitted from the lamp for a vehicle 1 depending on the pattern shape.

Like the above-described first pattern part 130, a plurality of second pattern parts 230 may be formed on one surface of the second image forming part 200, and in this case, a plurality of pattern shapes may be formed by the first pattern part 130 and the second pattern part 230 that correspond to each other. Hereinafter, although an example of one of the plurality of second pattern parts 230 is described in the exemplary embodiment of the present disclosure, other second pattern parts may be identically described.

The light emitted from the emitting surface 210 of the second image forming part 200 may pass through the first image forming part 100 to form the second image, and thus, the emitting surface 210 of the second image forming part 200 may be disposed to face a surface of the first image forming part 100 in which the first pattern part 130 is formed.

Figure 11:
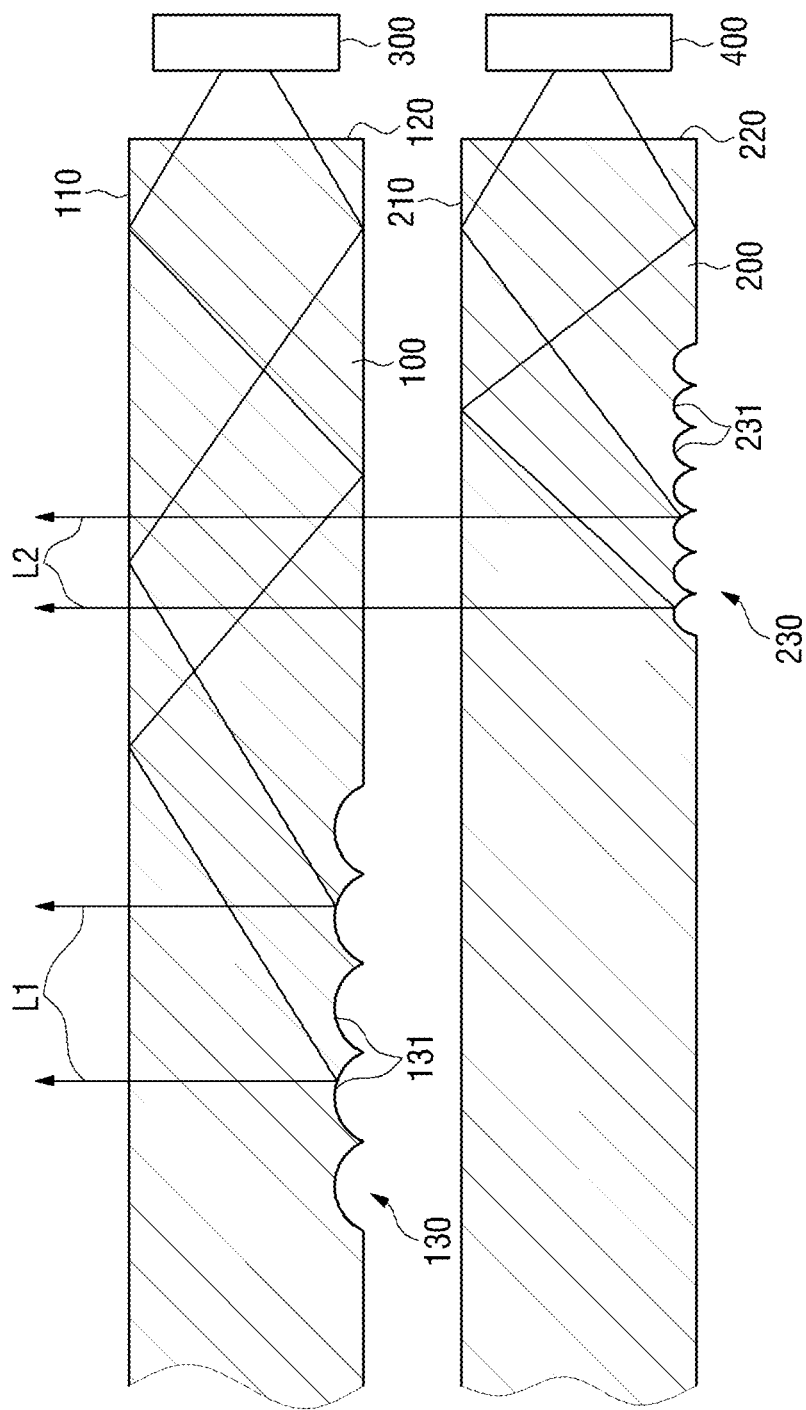
FIG. 11 is a schematic view illustrating a light path of the lamp for a vehicle according to the exemplary embodiment of the present disclosure.

For example, as shown in FIG. 11, light L1 incident from the at least one first light source 300 may be reflected to the emitting surface 110 by the first pattern part 130 to form the first image in the first image forming part 100, and light L2 emitted to the emitting surface 210 may pass through the first image forming part 100 to form the second image in the second image forming part 200 disposed behind the first image forming part 100.

In this case, the first image and the second image may be formed to have a particular interval based on a view point from the outside, and the interval may be adjusted by at least one of an interval between the first pattern part 130 and the second pattern part 230 that correspond to each other in the direction perpendicular to the direction in which the light is emitted from the lamp for a vehicle 1 of the present disclosure or an interval between the first image forming part 100 and the second image forming part 200 in the direction in which the light is emitted from the lamp for a vehicle 1 of the present disclosure.

When the interval between the first pattern part 130 and the second pattern part 230 is too wide or the interval between the first image forming part 100 and the second image forming part 200 is too wide, since the interval between the first image and the second image each formed in the first image forming part 100 and the second image forming part 200 becomes relatively wider depending on the view point from the outside, the three-dimensional effect may be degraded. Conversely, when the interval between the first pattern part 130 and the second pattern part 230 or the interval between the first image forming part 100 and the second image forming part 200 is too narrow, since the first image and the second image overlap each other and thus a particular pattern shape may be unable to be formed depending on the view point from the outside, it may be adjusted to have a particular interval.

In the exemplary embodiment of the present disclosure, the first image forming part 100 may be disposed to entirely cover the emitting surface 210 of the second image forming part 200, however, the present disclosure is not limited thereto, and the first image forming part 100 may be disposed to cover at least a part of the emitting surface 210 of the second image forming part 200.

The second pattern part 230 may include at least one optical pattern 231 configured to reflect the light incident to the at least one incident surface 220 to the emitting surface 210, and like the first pattern part 130, may allow the light to be reflected to the emitting surface 210 at different light amounts based on a direction in which the at least one optical pattern 231 is formed to adjust luminance of the second image formed by the second image forming part 200.

Figure 12:
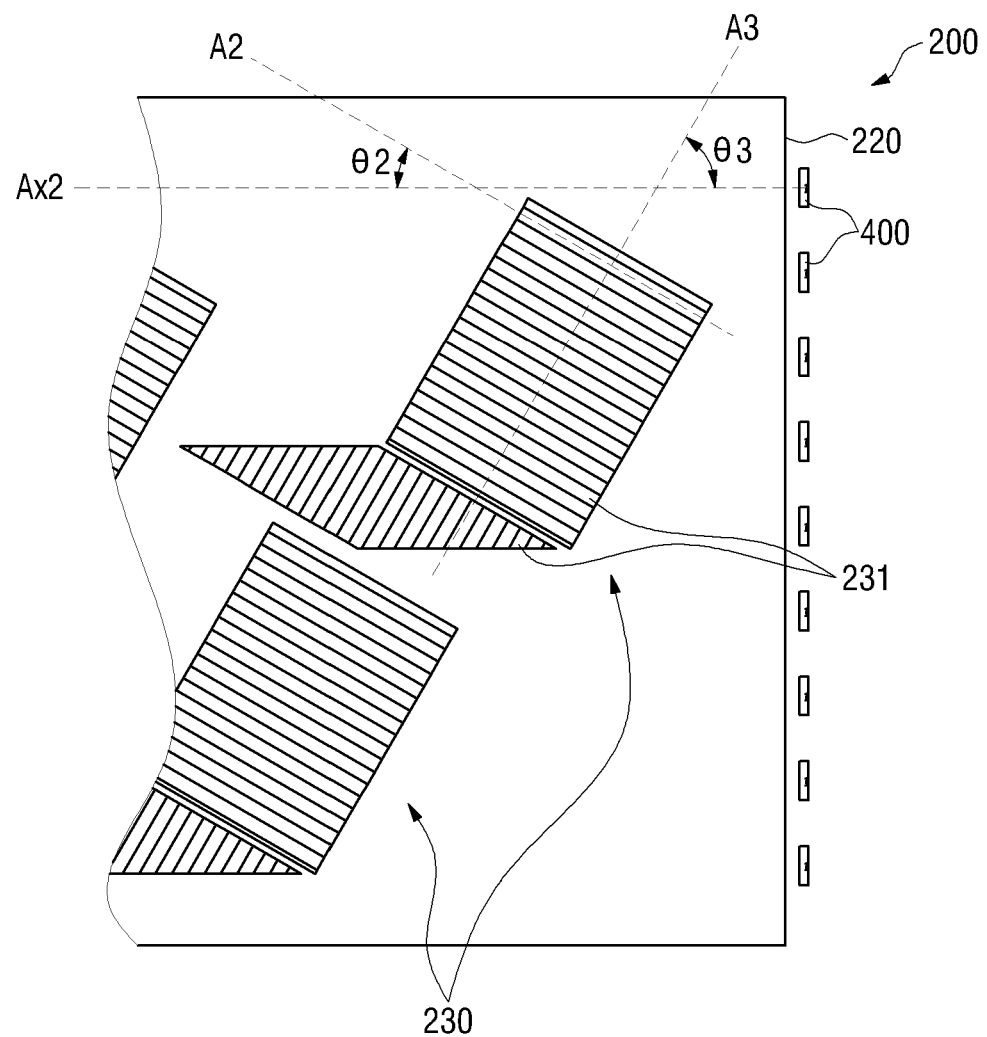
FIG. 12 is a schematic view illustrating a forming direction of an optical pattern of a second pattern part according to the exemplary embodiment of the present disclosure.

In other words, the at least one optical pattern 231 may be formed to extend in a predetermined direction, and as shown in FIG. 12, the light amount of the light reflected to the emitting surface 210 by the second pattern part 230 may be varied based on angles θ2 and θ3 between forming directions A2 and A3 of the at least one optical pattern 231 and a light axis Ax2 of the at least one second light source 400. For example, like the first pattern part 130, in the second pattern part 230, the light amount of the light reflected to the emitting surface 210 by the second pattern part 230 may decrease and thus the luminance of the second image may decrease when the angles θ2 and θ3 between the forming directions A2 and A3 of the at least one optical pattern 231 and the light axis Ax2 of the at least one second light source 400 decrease (e.g., deviate from a right angle), and the light amount of the light reflected to the emitting surface 210 may increase and thus the luminance of the second image may increase when the angles θ2 and θ3 between the forming directions A2 and A3 of the at least one optical pattern 231 and the light axis Ax2 of the at least one second light source 400 become closer to a right angle.

Accordingly, a color characteristic, e.g., brightness of the second image may be varied through the angles θ2 and θ3 between the forming directions A2 and A3 of the at least one optical pattern 231 and the light axis Ax2 of the at least one second light source 400. In this case, unlike the first pattern part 130, the second pattern part 230 may form the angles θ2 and θ3, of which the value is greater than the angle formed by the first pattern part 130, with the light axis Ax2 of the at least one second light source 400, since all of the forming directions A1 of the at least one optical pattern 131 are the same in the first pattern part 130 whereas the at least one optical pattern 231 has a plurality of forming directions A2 and A3 in the second pattern part 230.

Therefore, when the at least one optical pattern 231 of the second pattern part 230 has the plurality of forming directions A2 and A3, the second image may have a plurality of color characteristics, and in this case, since an effect as in a case in which three images are formed may be gained even when two images are formed by the first pattern part 130 and the second pattern part 230, more various pattern shapes may be implemented.

In the exemplary embodiment of the present disclosure, the at least one optical pattern 231 of the second pattern part 230 may have the plurality of forming directions A2 and A3, however, the present disclosure is not limited thereto, and the at least one optical pattern 131 of the first pattern part 130 may have a plurality of forming directions.

In the exemplary embodiment of the present disclosure, a plurality of optical patterns 231 may be arranged in a predetermined direction to allow the second pattern part 230 to have a shape of the second image. However, since the above is merely an example for understanding the present disclosure, the present disclosure is not limited thereto, and the number, a length, a forming direction, and the like of the at least one optical pattern 231 may be varied based on the shape of the second image.

In addition, the at least one optical pattern 231 of the second pattern part 230 may have a width that ranges from about 0.5 to about 2 mm like the first pattern part 130, and may be formed to have a shape of a circumference of a circle having a radius of about 50 to 70% with respect to the width.

Further, like the above-described at least one first light source 300, the at least one second light source 400 may generate substantially white light of which color coordinates (x, y) are included in a scope of 0.310≤x≤0.500 and 0.283≤y≤0.440, and may generate substantially red light of which color coordinates (x, y) are included in a scope of 0.645≤x≤0.735 and 0.259≤y≤0.335 with respect to the CIE 1931 color coordinate system as shown in FIG. 8.

The first image formed by the above-described first image forming part 100 and the second image formed by the second image forming part 200 may be combined to form a predetermined pattern shape, and in this case, the three-dimensional effect may be applied to the pattern shape by varying the color characteristics of the first image and the second image. The above-described color characteristic may include the color, the brightness, and the chroma, and in the exemplary embodiment of the present disclosure, since at least one of colors, brightness, or chroma of the first image and the second image are different from each other, and the first image and the second image have different color characteristics, depths of the first image and the second image may be different to apply the three-dimensional effect to the pattern shape.

Hereinafter, a case in which the three-dimensional effect is applied to the pattern shape by varying the color characteristics of the first image and the second image will be described in detail.

First, when each of the first image forming part 100 and the second image forming part 200 is formed of a transparent material, the color characteristics of the first image and the second image may be changed based on color characteristics of the light generated from at least one first light source 300 and the at least one second light source 400, respectively. For example, when the white light included in the scope R1 in the above-described FIG. 9 is generated from the at least one first light source 300 and the at least one second light source 400, the light having a color temperature of about 2500 K is generated from the at least one first light source 300, and the light having a color temperature of about 6500 K is generated from the at least one second light source 400, since a color difference between the first image and the second image occurs, the pattern shape in which the first image and the second image are combined may have the three-dimensional effect.

Further, when the red light included in the scope R2 in the above-described FIG. 10 is generated from the at least one first light source 300 and the at least one second light source 400, the light having a wavelength of about 617 nm is generated from the at least one first light source 300, and the light having a wavelength of about 633 nm is generated from the at least one second light source 400, since the color difference between the first image and the second image occurs, the pattern shape in which the first image and the second image are combined may have the three-dimensional effect.

In the above-described exemplary embodiment, light having different color temperatures or different wavelengths may be generated from the at least one first light source 300 and the at least one second light source 400. However, the present disclosure is not limited thereto, and since a brightness difference between the first image and the second image occurs even when the light generated from the at least one first light source 300 and the at least one second light source 400 has a difference in light amount, the pattern shape in which the first image and the second image are combined may have the three-dimensional effect.

In this case, as described above, although the brightness of the first image and the second image may be varied based on the light amount of the light generated from the at least one first light source 300 and the at least one second light source 400, it is not limited thereto, and since the light amount emitted from the first image forming part 100 and the second image forming part 200 is varied based on the forming direction A1 of the at least one optical pattern 131 of the first pattern part 130 and the forming directions A2 and A3 of the at least one optical pattern 231 of the second pattern part 230 even when the light generated from the at least one first light source 300 and the at least one second light source 400 has the same light amount, the first image and the second image may have different brightness.

Furthermore, in the above-described exemplary embodiment, each of the first image forming part 100 and the second image forming part 200 may be a transparent lens, and the color characteristics of the first image and the second image may be varied based on the color characteristics of the light generated from the at least one first light source 300 and the at least one second light source 400. However, the present disclosure is not limited thereto, and the color characteristics of the first image and the second image may be varied based on the color characteristics of the first image forming part 100 and the second image forming part 200.

For example, in the case in which the first image forming part 100 and the second image forming part 200 have different colors even when the light having the same wavelength or the same color temperature is generated from the at least one first light source 300 and the at least one second light source 400, since the first image and the second image may have a color in which the colors of the first image forming part 100 and the second image forming part 200 are mixed, the pattern shape in which the first image and the second image are combined may have the three-dimensional effect. In this case, since the light emitted from the second image forming part 200 passes through the first image forming part 100 to form the second image, the second image may have both the color of the second image forming part 200 and also the color in which the colors of the first image forming part 100 and the second image forming part 200 are mixed.

In the exemplary embodiment of the present disclosure, the light generated from the at least one first light source 300 and the at least one second light source 400 may have different color characteristics, the light may be reflected by the first pattern part 130 and the second pattern part 230 at different light amounts, and the first image forming part 100 and the second image forming part 200 may have the different color characteristics. However, since the above is merely an example for understanding the present disclosure, the present disclosure is not limited thereto, and the color characteristics of the first image and the second image may be varied by a combination of at least one of the color characteristics of the light generated from the at least one first light source 300 and the at least one second light source 400, the light amount of the light reflected by the first pattern part 130 and the second pattern part 130, or the color characteristics of the first image forming part 100 and the second image forming part 200.

Figure 13:
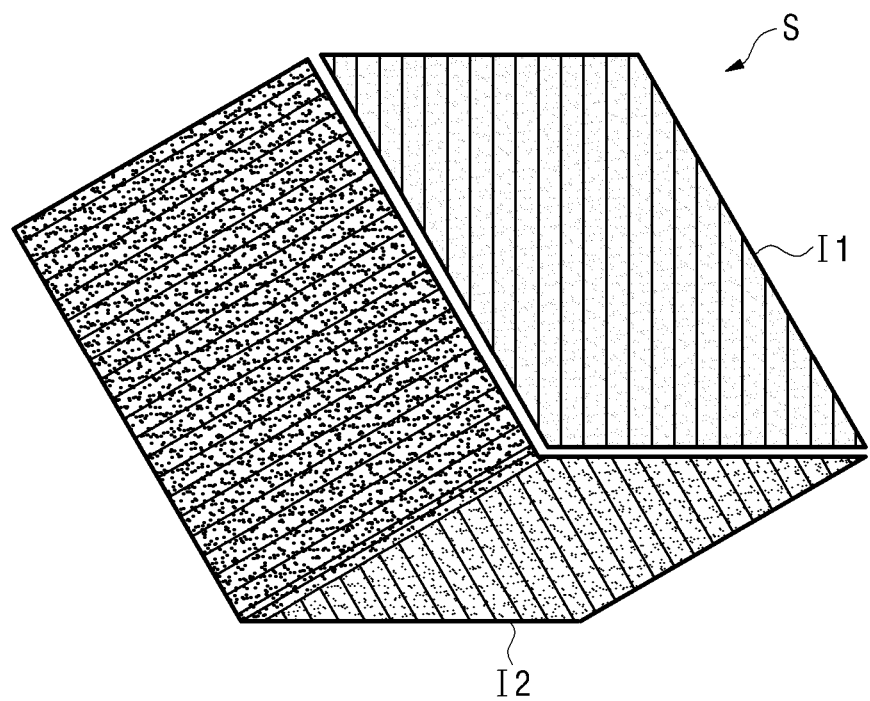
FIG. 13 is a schematic view illustrating a pattern shape formed by the lamp for a vehicle according to the exemplary embodiment of the present disclosure.

As described above, when the color characteristics of the first image and the second image are different from each other, as shown in FIG. 13, since a part of a pattern shape S in which a first image I1 and a second image I2 are mixed has a color characteristic different from that of another part, depths of the first image I1 and the second image I2 may become different from each other, and thus the pattern shape S formed by the light emitted from the lamp for a vehicle 1 of the present disclosure may have the three-dimensional effect. In this case, the second image I2 may have a plurality of color characteristics in the above-described FIG. 13, since the at least one optical pattern 231 of the second pattern part 230 are formed in a plurality of directions A2 and A3 as shown in FIG. 12, and when the at least one optical pattern 231 of the second pattern part 230 are formed in the same direction, the second image may generally have the same color characteristic. The above-described FIG. 13 is an example of a case in which a difference between the color characteristics of the first image I1 and the second image I2 are shaded and, as described above, it should be understood that at least one of the color characteristics of the pattern shape S, e.g., color, brightness, and chroma of the pattern shape S may be varied.

Further, in the exemplary embodiment of the present disclosure, although examples of the first image forming part 100 forming the first image and the second image forming part 200 forming the second image are described, the present disclosure is not limited thereto, and the number of image forming parts may be varied based on the number of images that form the pattern shape.

In addition, in the above-described exemplary embodiment, the at least one first light source 300 and the at least one second light source 400 may be lighted simultaneously to form a predetermined pattern shape in which the first image and the second image are mixed. However, the present disclosure is not limited thereto, and the at least one first light source 300 and the at least one second light source 400 may be alternately lighted or either of the at least one first light source 300 or the at least one second light source 400 may be lighted in accordance with the purpose of the lamp for a vehicle 1 of the present disclosure.

For example, when the lamp for a vehicle 1 of the present disclosure is used for at least two purposes, one of the at least one first light source 300 or the at least one second light source 400 may be lighted in accordance with each purpose, and thus one of the first image and the second image may be formed, and in this case, the first image may be understood to be formed for a first purpose, and the second image may be understood to be formed for a second purpose.

In the above-described exemplary embodiment, one of the first image and the second image may be formed based on each purpose when the lamp for a vehicle 1 is used for at least two purposes, however, the present disclosure is not limited thereto, and the at least one first light source 300 and the at least one second light source 400 may be sequentially and alternately lighted to form the first image and the second image alternately. For example, when the lamp for a vehicle 1 of the present disclosure is used as a turn signal lamp, the at least one first light source 300 and the at least one second light source 400 may be sequentially and alternately lighted to provide an improved visual effect.

As described above, in the lamp for a vehicle 1 of the present disclosure, since the pattern shape in which the first image and the second image are combined may have the three-dimensional effect by varying the color characteristics of the first image and the second image formed by the first image forming part 100 and the second image forming part 200, the pattern shape may have the three-dimensional effect more easily without an additional configuration, and thus a configuration may be simplified and the exterior design may be improved.

The above-described lamp for a vehicle of the present disclosure achieves at least one of the following effects. Since a pattern shape having a three-dimensional effect may be implemented through a combination of images of different color characteristics, a configuration may be simplified and an exterior design may be improved.

It should be noted that effects of the present disclosure are not limited to the above-mentioned effects, and other effects of the present disclosure will be apparent to those skilled in the art from descriptions in the claim.

Those skilled in the art of the present disclosure may understand that the present disclosure may be embodied in other specific forms without changing the technical spirit or essential characteristics. Accordingly, the above described embodiments should be understood to be exemplary and not limiting. The scope of the present disclosure is shown by the claims rather than the detailed description, and all variations or different forms derived from the means, scope, and equivalents of the claims should be interpreted to be included in the scope of the present disclosure.

What is claimed is:

1. A lamp for a vehicle comprising:
    a first image forming part configured to emit light incident from at least one first light source to form a first image; and
    a second image forming part configured to emit light incident from at least one second light source to form a second image combined with the first image to form a predetermined pattern shape,
    wherein the light emitted from the second image forming part passes through the first image forming part to form the second image, and the first image and the second image have different color characteristics,
    wherein the first image forming part includes a first pattern part configured to reflect the light incident from the at least one first light source to a first emitting surface to form the first image on one surface thereof,
    wherein the second image forming part includes a second pattern part configured to reflect the light incident from the at least one second light source to a second emitting surface to form the second image on one surface thereof,
    wherein each of the first pattern part and the second pattern part includes at least one optical pattern formed to extend in a predetermined direction,
    wherein the first pattern part is configured to reflect the light at different light amounts based on an angle between a forming direction of the at least one optical pattern of the first pattern part and a light axis of the at least one first light source; and
    wherein the second pattern part is configured to reflect the light at different light amounts based on an angle between a forming direction of the at least one optical pattern of the second pattern part and a light axis of the at least one second light source.

2. The lamp for the vehicle of claim 1, wherein the color characteristic includes at least one of a color, a brightness, or a chroma.

3. The lamp for the vehicle of claim 1, wherein a surface of the first image forming part in which the first pattern part is disposed to face the second emitting surface of the second image forming part.

4. The lamp for the vehicle of claim 1, wherein a color characteristic of the first image is varied by at least one of a color characteristic of the at least one first light source, a color characteristic of the first image forming part, or a light amount of the light reflected by the first pattern part.

5. The lamp for the vehicle of claim 1, wherein a color characteristic of the second image is varied by at least one of a color characteristic of the at least one second light source, a color characteristic of the first image forming part, a color characteristic of the second image forming part, or a light amount of the light reflected by the second pattern part.

6. The lamp for the vehicle of claim 1, wherein the at least one optical pattern has a width of about 0.5 to 2 mm.

7. The lamp for the vehicle of claim 1, wherein the at least one optical pattern has a shape of at least a part of a circumference of a circle having a radius of about 50 to 70% of a width of the at least one optical pattern.

8. The lamp for the vehicle of claim 7, wherein a diffusion angle of light reflected by the at least one optical pattern is varied based on a ratio of the radius to the width of the at least one optical pattern.

9. The lamp for the vehicle of claim 1, wherein each of the at least one first light source and the at least one second light source generates substantially white light of which color coordinates (x, y) of a color coordinate system are included in a scope of $0.310 \leq x \leq 0.500$ and $0.283 \leq y \leq 0.440$.

10. The lamp for the vehicle of claim 9, wherein each of the at least one first light source and the at least one second light source generates light having a color temperature that ranges from about 2500 k to about 6500 k.

11. The lamp for the vehicle of claim 1, wherein each of the at least one first light source and the at least one second light source generates substantially red light of which color coordinates (x, y) of a color coordinate system are included in a scope of $0.645 \leq x \leq 0.735$ and $0.259 \leq y \leq 0.335$.

12. The lamp for the vehicle of claim 11, wherein each of the at least one first light source and the at least one second light source generates light having a wavelength ranging from about 610 to about 680 nm.

13. The lamp for the vehicle of claim 1, wherein the pattern shape has a first part and a second part having different depths based on a difference between the color characteristics of the first image and the second image.

14. A lamp for a vehicle comprising:
    a first image forming part configured to emit light incident from at least one first light source to form a first image; and
    a second image forming part configured to emit light incident from at least one second light source to form a second image combined with the first image to form a predetermined pattern shape,
    wherein the light emitted from the second image forming part passes through the first image forming part to form the second image, and the first image and the second image have different color characteristics, and
    wherein the pattern shape includes a first part and a second part having different depths based on a difference between the color characteristics of the first image and the second image.

15. A lamp for a vehicle comprising:
    a first image forming part configured to emit light incident from at least one first light source to form a first image; and
    a second image forming part configured to emit light incident from at least one second light source to form a second image combined with the first image to form a predetermined pattern shape,
    wherein the light emitted from the second image forming part passes through the first image forming part to form the second image, and the first image and the second image have different color characteristics, wherein at least of the first image forming part or the second image forming part includes a first optical pattern formed to extend in a first direction and a second optical pattern formed to extend in a second direction different from the first direction, and wherein the first optical pattern and the second optical pattern are configured to reflect different amounts of light due to a difference between the first direction and the second direction.

\* \* \* \* \*